Oct. 27, 1959
R. P. OGDEN
2,910,112
RESILIENT VEHICLE SEAT MOUNTING AND
ELASTIC JOINT THEREFOR
Filed Jan. 31, 1956
2 Sheets-Sheet 1
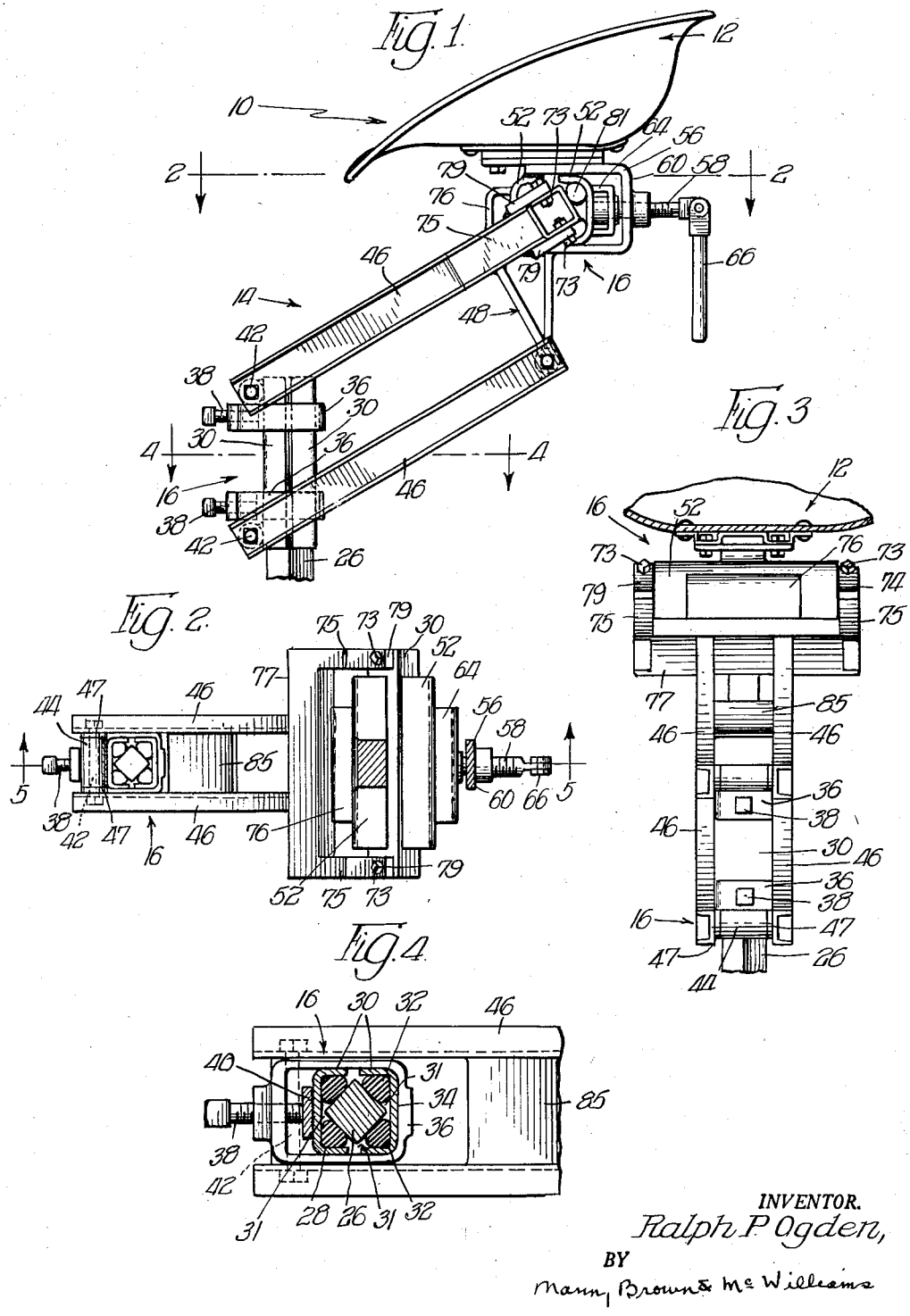
INVENTOR.
Ralph P. Ogden,
BY
Mann, Brown & McWilliams
Attys.

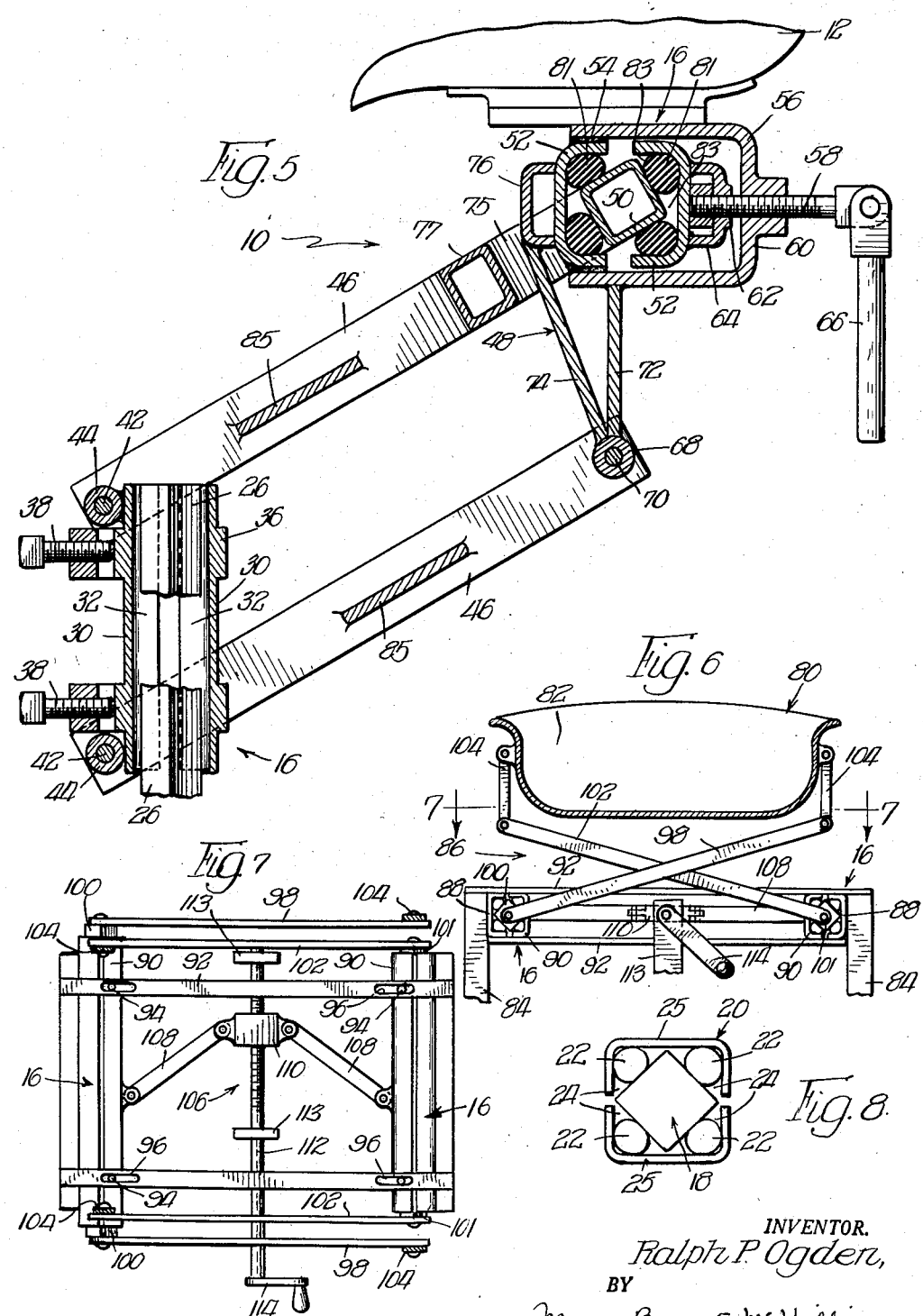

United States Patent Office 2,910,112
Patented Oct. 27, 1959

2,910,112

RESILIENT VEHICLE SEAT MOUNTING AND ELASTIC JOINT THEREFOR

Ralph P. Ogden, Hammond, Ind.

Application January 31, 1956, Serial No. 562,516

1 Claim. (Cl. 155—51)

My invention relates to a resilient vehicle seat mounting and an elastic joint therefor, and more particularly, to a seat and seat mounting including an improved dampened cushioning device.

Conventional seats for vehicles such as tractors and trucks have been mounted on or included cushioning devices of one form or another in an effort to make more comfortable the customary rough ride given the user by such vehicles. However, the seat mounting frequently does no more than transmit the shock from bumps or the like directly to the one using the seat or cause objectionable bouncing of the seat as the springs are too flexible or stiff, or the forced vibration is near or coincides with the natural frequency of the elastic system including the person using the seat, the seat, and the seat mounting.

While seat mountings frequently include damping devices for controlling the cushioning devices to provide a more comfortable ride to the user, they are inherently set to function properly only when a person of predetermined weight sits upon the seat. This is because the weight of the person on the seat is an important factor in the natural frequency of vibration of the elastic system that includes the seat and the cushioning device employed. For any given natural frequency of the system, the damping effect employed for a person of one weight will not give a comfortable ride to a person of greater or lesser weight.

A principal object of this invention is to provide a dampened cushioning mounting for vehicle seats and the like which may be adjusted by the user to provide a ride that is most comfortable to him.

A further principal object of the invention is to provide an improved torsion spring in which the natural frequency thereof may be adjusted.

Still a further object of the invention is to provide a vehicle seat including a mounting therefor employing novel elastic joints having an adjustable snubbing or damping effect.

Yet a further object of the invention is to provide a swayable vehicle seat for tractors and the like in which sway is dampened or snubbed, as well as up and down movement.

Other objects, uses, and advantages will be obvious or become apparent from a consideration of the following description and the accompanying drawings.

In the drawings:

Figure 1 is a side elevational view of a swayable vehicle seat and mounting therefor that may be employed, for instance, on vehicles such as tractors;

Figure 2 is a cross sectional view along line 2—2 of Figure 1;

Figure 3 is a front elevational view of the seat shown in Figure 1, with parts shown in section;

Figure 4 is a cross sectional view along line 4—4 of Figure 1;

Figure 5 is an enlarged cross sectional view along line 5—5 of Figure 2, parts being shown in elevation;

Figure 6 is a front elevational view of a modified form of seat mounting for trucks and the like;

Figure 7 is a cross sectional view along line 7—7 of Figure 6; and

Figure 8 is a diagrammatic side elevational view of a flexible joint per se.

Reference numeral 10 of Figures 1 and 5 generally indicates a swayable seat, that is particularly adapted for use on vehicles such as tractors, which tend to sway considerably during operation due to the unevenness of the ground on which they are employed. The seat 10 comprises a seat frame 12 of any conventional form that provides the actual seat for the rider, and the seat mounting 14 including improved torsional springs or elastic joints 16.

The torsional springs 16 are an improvement over that disclosed in United States Patent No. 2,712,742 to Hermann J. Neidhart granted July 12, 1955. Generally speaking, the improved spring 16 per se comprises (see Figure 8) an inner polygonal core member 18, a tubular polygonal member 20 received about the member 18, and a plurality of elastic rods or rod-like elements 22 positioned between the members 18 and 20. The polygonal members 18 and 20 are provided with an equal number of sides, and in the unloaded position, the members 18 and 20 are positioned with respect to each other so that the apexes of member 18 are adjacent the inner faces of tubular member 20. In this position, these members define pockets 24 in which the elastic elements 22 are received.

As described in said patent, when one of the members 18 or 20 is turned with respect to the other, the relative rotation is resisted by the elastic rods 22 that form cushioning elements, each of which tends to rotate and roll along the inner faces of the tubular member 20.

In the embodiment shown in Figure 8, the polygonal members are square in configuration and the angle of rotation or pivotal movement provided between the members 18 and 20 should not be permitted to exceed approximately 42 degrees. The polygonal members may have other configurations, however, as for instance, they may be three, five, six, seven, eight or more sided, though the higher the number of sides, the less the angle of permissible movement between the two members.

In accordance with my invention, the member 20 comprises a plurality of elements ringing or encircling the member 18 and so arranged that at least one of these elements is mounted for adjustment toward and away from the member 18. Such an arrangement makes the tubular member 20 adjustable in width or thickness, which controls the compression applied to the elastic rods 22 and thus their tendency to resist forces that tend to rotate or pivot members 18 or 20 with respect to each other.

As shown diagrammatically in Figure 8, member 20 of the illustrated embodiment comprises channel elements 25, one or both of which are to be mounted for movement laterally of member 18. In joints having other than a square configuration, the tubular member would be approximately divided to provide the result desired. The tubular member 20 may also be comprised of four angle members separately movable with respect to member 18, and the tubular member of elastic joints having a different configuration similarly divided; when arranged in this manner, the compression on each elastic rod 22 may be adjusted individually.

Referring to Figure 4, a square configuration is employed in the flexible joints 16 in the seat 10, and reference numeral 26 indicates a solid inner polygonal member positioned within tubular member 28, comprising a pair of channel shaped elements 30, elastic rods or cushioning devices 32 being interposed between the members 26 and 28 in the pockets 31 defined by these members. In the embodiment of the invention shown in Figures 1 through 5, the member 26 is fixed in any suitable manner to the vehicle frame. One of the elements 30 is welded as at 34 (see Figure 4) to yoke elements 36, while the other element 30 is slidably mounted in these yoke elements 36 for lateral movement with respect thereto. Each yoke element 36 is provided with an adjustment screw 38 that engages a boss 40 (see Figure 4) formed on the outer surface of the slidably mounted element 30.

By moving the screw elements 38 to the left or to the right of Figure 4, the compression applied to elastic rods 32 is varied and thus is the tendency to oppose or snub or dampen rotational or pivotal movement of the member 28 with respect to the member 26, as well as the cushioning effect provided.

The seat mounting 14 also includes a pair of pins 42 mounted in sleeves 44 that are welded to the slidably mounted element 30. Bars 46 are pivotally connected to pins 42 in any suitable manner at like ends, suitable washers 47 separating the respective bars 46 and sleeves 44, if so desired, and at their other ends are pivotally connected to a linkage element 48. One of the pivotal joints at the outwardly extending ends of bars 46 comprises an elastic joint 16, similar to the joint 16 shown in Figure 4.

As shown in Figure 5, a tubular square member 50 is secured between the two upper bars 46 and a pair of channel elements 52 are mounted about the member 50. One of the channel elements 52 is welded as at 54 to a yoke 56, while the other element 52 is slidably mounted in this yoke for lateral movement with respect thereto. A screw element 58 is screw threadedly mounted in the web 60 of yoke 56 and is received in a hole 62 formed by suitable structure 64 welded to the slidably mounted channel element 52, and the inner end of screw element 58 bears against the web of this channel element 52. The screw element 58 may be provided with a suitable handle 66 to aid in turning same. The yoke 56 is an integral part of the linkage element 48 which includes a sleeve 68 pivoted between the lower bars 46 by a pin 70, and arms 72 and 74 welded to sleeve 68, yoke 56 and channel element 76, respectively, the channel element 76 being fixed to the fixed channel element 52 as by welding or the like. In the illustrated embodiment, member 50 is fixed by bolts 73 (see Figure 2) between the arms 75 of U-shaped frame 77 that is welded to the ends of upper bars 46. The bolts 73 are received in extensions 79 that are in turn welded to the respective arms 75.

The seat frame 12 may be secured in any suitable manner to the yoke 56. The elastic rods 81 are received in pockets 83 formed by member 50 and elements 52.

The bars 46, linkage element 48, pin 70, and the upper elastic joint 16, together with pins 42, form a parallel linkage that maintains the seat frame 12 in its normal upright position during up and down movement. The lower elastic joint 16 is adapted to permit or provide dampened sway movement while the upper elastic joint 16 is adapted to permit or provide dampened up and down movement. Webs 85 may interconnect the upper and lower pairs of bars 46 of the illustrated embodiment.

When one climbs into a seat 10 to operate a tractor or the like on which the seat is mounted, all he need do is adjust the screws 38 and 58 to provide the correct dampened cushioning effect for his weight that will give a comfortable ride. I contemplate that suitable indicia or calibrations may be provided on the seat 10 to indicate appropriate settings for the elastic joints so that the seat may be adjusted before one goes into the field.

The cushioning effect of joints 16 is provided by relative rotation of the inner tubular member with respect to the outer tubular member, or vice versa, or both, as the case may be, the relative movement being resisted by the elastic rod-like elements, each of which tends to rotate and roll along the surfaces of the members which they contact. The cushioning effect is dampened as the rods are subjected to more or more compression as the inner and outer members are rotated or pivoted with respect to each other. The damping effect as well as the cushioning effect is adjusted by adjusting the positioning of the channel elements making up the tubular member of the illustrated embodiments with respect to the inner member and thus the compression applied to the elastic rods, and their consequent resistance to relative movement between the two members of the joint.

It will be appreciated that a sway type seat mounting need not include the illustrated parallel linkage, though the ride spring for the seat would be mounted on the sway spring housing, or supported in any other suitable manner. It will be noted that the compression applied to elastic elements 32 of the sway spring 16 holds the seat mounting at its desired elevation.

Figures 6 and 7 diagrammatically illustrate a modified form of the invention particularly adapted for use in trucks or other vehicles where swaying movement is ordinarily not excessive or objectionable, while up and down movement or bouncing may be. The seat 80 comprises a seat frame 82 supported above suitable vehicle frame members 84 by seat mounting 86. The seat mounting 86 comprises a pair of elastic joints 16 mounted below each side of the seat 80. One channel element 88 of each joint 16 is fixed with respect to respective vehicle frame members 84 while the other channel element 90 is slidably mounted between, for instance, guide bars 92 extending under the seat and fixed in any suitable manner to the frame members 84 or the fixed channel elements 88. As seen in Figure 7, the movable channels 90 may be provided with guide pins 94 positioned in guide slots 96 formed in guide bars 92.

Links or arms 98 are fixed to the front and rear ends of an inner member 100 of one of the elastic joints 16 and similar arms or links 102 are fixed to the front and rear ends of the inner member 101 of the other elastic joint 16. Links 98 and 102 are in turn pivotally connected to substantially vertical links or arms 104 that are in turn pivotally connected to the sides of the seat frame 82. Suitable guide means (not shown) may be provided for guiding up and down movement of seat frame 82.

Referring to Figure 7, a toggle mechanism 106 is provided for uniformly moving movable channel elements 90 comprising a pair of links or arms 108 pivotally secured to the respective channel elements 90 and a central thrust member 110 screw threadedly mounted on a rod 112 rotatably mounted in members 113 fixed in any suitable manner to the vehicle frame. Rod 112 may include handle 114 for ease in actuating the mechanism 106.

When a driver or passenger of a vehicle such as a truck in which the seat 80 is mounted sits in this seat, the up and down movement occurring when the vehicle encounters bumps is dampened by the elastic joints 16. The damping effect provided may be adjusted in accordance with one's weight by merely appropriately actuating the toggle mechanism 106. This may be done after the user takes his seat, though I contemplate that the toggle mechanism may be calibrated so that suitable settings may be made in accordance with one's weight before one uses the seat.

The structures described above may be formed from any suitable substances that will provide the results desired. The elastic rods or rod-like elements may be formed from rubber or its equivalent and a durometer of approximately 70 is preferred. Generally speaking, the harder the rubber, the less rubber is needed to make a spring, as the thickness of the spring can be smaller.

My improved elastic joints comprise essentially adjustable torsion springs in which the natural frequency of the spring may be changed by varying the compression applied to the elastic rods. This changes the natural frequency of a seat 10 or 80 as a whole, since the natural frequency is determined by weight and leverage. In accordance with my invention, the natural frequency of the elastic joints is adjusted to provide an optimum natural frequency for the weight of an individual rider.

It should be noted that the damping effect provided in the illustrated embodiments applies to both up and down movement. In conventional damping constuctions, the shock absorber or snubber acts only in one direction.

The foregoing description and the drawings are given merely to explain and illustrate my invention, and the invention is not to be limited thereto, except insofar as the appended claim is so limited since those skilled in the art who have my disclosure before them will be able to make modifications and variations therein without departing from the scope of the invention.

I claim:

A seat for vehicles comprising a seat frame, a generally upright inner polygonal member secured to the vehicle, a tubular polygonal member received about said upright member, said members having the same number of sides and being positioned with respect to each other in the unloaded condition of the seat so that the apexes of said upright member are positioned adjacent the respective inner faces of said tubular member, said members defining pockets equal in number to the number of sides of said members, an elongate elastic rod-like element positioned in each of said pockets, a generally vertically disposed parallel linkage secured to said tubular member, said parallel linkage comprising a pair of spaced apart bars, a pair of vertically spaced pins fixed to said tubular member, one of said bars being pivotally connected to one of said pins, and the other of said bars being pivotally connected to the other of said pins, link means positioned between the other ends of said bars, and means for pivotally connecting said link means to said other ends of said bars, said means at one of said other ends of said bars comprising a generally horizontal inner polygonal member, a tubular, generally horizontal polygonal member received about said inner horizontal member, said inner horizontal member and the last mentioned tubular member having the same number of sides and being positioned with respect to each other in the unloaded condition of the seat so that the apexes of said inner horizontal member are positioned adjacent the respective inner faces of said last mentioned tubular member, said inner horizontal member and said last mentioned tubular member defining pockets equal in number to the number of sides of these members, an elongate elastic rod-like element received in each of the last mentioned pockets, means securing one of the horizontal members to said linkage, and means securing the other of the horizontal members to said seat frame.

References Cited in the file of this patent

UNITED STATES PATENTS

| 1,610,069 | Weber | Dec. 7, 1926 |
| 1,731,412 | Froesch | Oct. 15, 1929 |
| 2,167,911 | Schieferstein | Aug. 1, 1939 |
| 2,588,638 | Krotz et al. | Mar. 11, 1952 |
| 2,629,427 | McIntyre | Feb. 24, 1953 |
| 2,630,854 | Neher | Mar. 10, 1953 |
| 2,652,880 | Gundersen | Sept. 22, 1953 |
| 2,712,742 | Neidhart | July 12, 1955 |

FOREIGN PATENTS

| 241,462 | Great Britain | Oct. 22, 1925 |
| 275,739 | Switzerland | Sept. 1, 1951 |
| 957,495 | France | Aug. 22, 1949 |
| 1,081,131 | France | June 4, 1954 |